May 5, 1964
R. S. THOMAS
3,131,477
PROTECTIVE RIFLE SIGHT COVERING
Filed Nov. 4, 1960
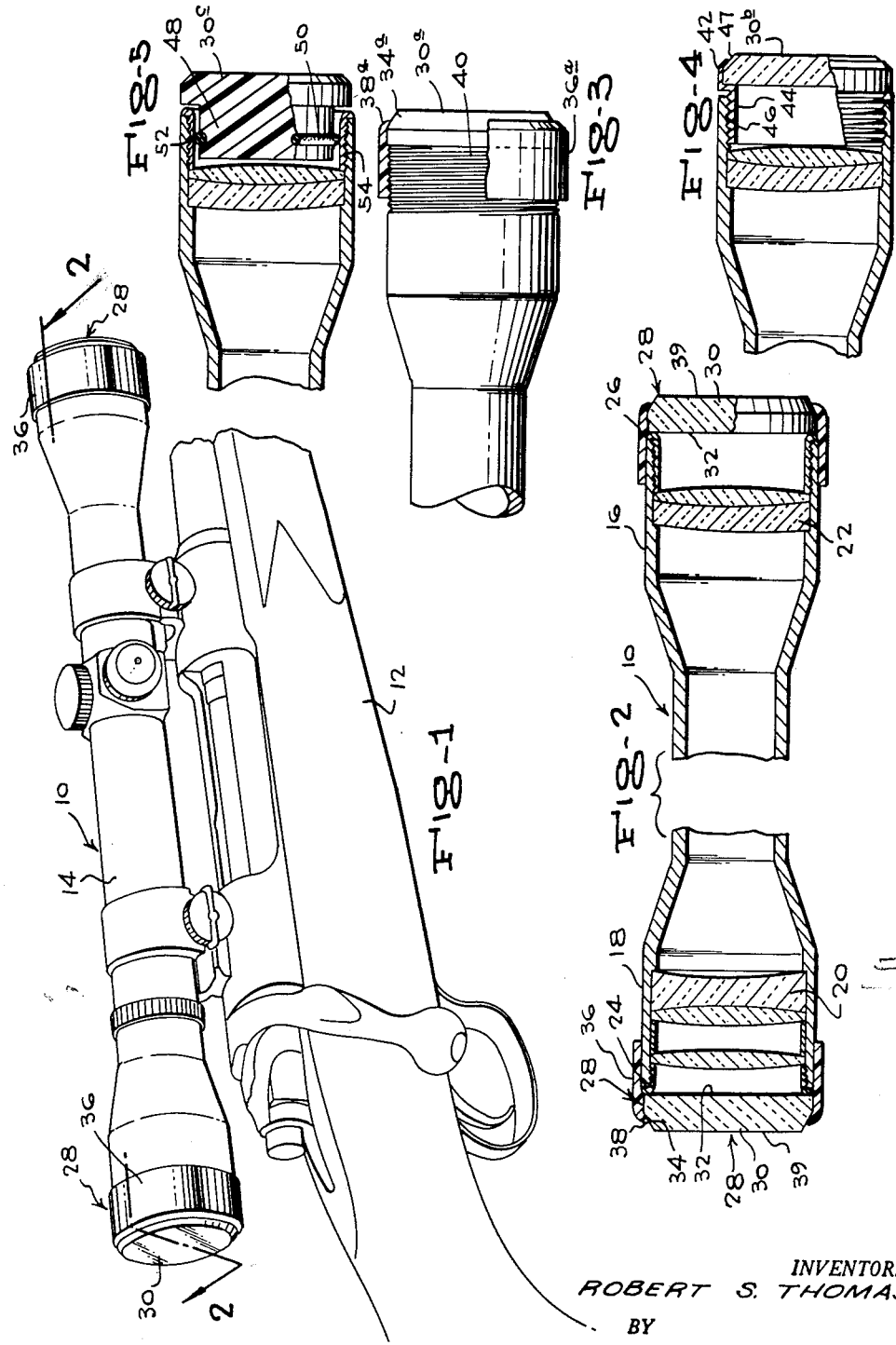
INVENTOR.
ROBERT S. THOMAS
BY
McMorrow, Berman & Davidson
ATTORNEYS

United States Patent Office 3,131,477
Patented May 5, 1964

3,131,477
PROTECTIVE RIFLE SIGHT COVERING
Robert S. Thomas, Mukwonago, Wis.
(Perry, W. Va.)
Filed Nov. 4, 1960, Ser. No. 67,391
7 Claims. (Cl. 33—50)

The present invention appertains to improvements in optical systems of the binocular or rifle scope type and is particularly directed to a novel telescopic rifle sight.

Conventional telescopic sights comprise a tube having opposing enlarged tubular, open ends, one end supporting an objective lens system and the opposing end supporting an ocular lens system. The lens systems are recessed in the two ends so as to be spaced from the ends of the tube.

During use of the telescopic sight, when it is mounted on a rifle, it becomes necessary to clean the outer exposed surfaces of the lens systems because in dry weather dust adheres to the surfaces and in inclement weather, ice forms on the surfaces and rain fogs the sufaces so as to interfere with the proper use of the telescopic rifle sight. Practically, the only way in which the surfaces can be cleaned is to insert a cloth wrapped around a finger into the tube and wipe off the surfaces. This is time-consuming and bothersome when desiring to ready the sight for immediate use and further is not completely effective to clean the lens systems.

In order to overcome this drawback, various types of lens covers have been devised but, in most instances, the lens covers must be removed before the sight can be used. Obviously, this is most impractical when hunting because instantaneous sighting and firing of the rifle is desired when game is spotted. Some few covers are formed so as to be used with the scope without being removed but these are extremely complicated and expensive and require servicing in use and add considerably to the cost of the scope. Even with these forms of covers, it has been found that the problem of obtaining the most effective use of the lens systems is not completely solved.

A primary object of the present invention is to provide a practical protective cover assembly for the lens systems of the telescopic sight which cover assembly will prevent the lens system from becoming fogged or otherwise in any way affected by the elements and which cover assembly will permit instantaneous use of the telescopic rifle sight.

The protective cover assembly comprises a transparent member which is sealingly mounted on the outer ends of the tube of the telescopic sight in such a way as to completely seal off and protectively overlie the lens systems in the two ends and so that the outer surfaces of the transparent members are exposed and lie beyond the ends of the tubes. With the outer surfaces exposed, it can be appreciated that the surfaces can be readily cleaned by passing the surfaces over the sleeve of the shirt of a hunter's jacket or using any other desired and easy method of cleaning the surfaces, even wiping the surfaces with the finger or palm of the hand. It is obvious that the surfaces can be instantly cleaned so that the telescopic sight will be always ready for immediate use.

Various means may be provided for securing the protective member, which is in the form of a disc or annular lens on the tube ends. It is proposed, within the scope of the present invention, to provide means for attaching the protective cover assembly to existing telescopic rifle sights and also to provide means whereby a manufacturer may secure the protective cover assembly in place when the telescopic sight is being manufactured.

A further important object of the present invention is to provide a protective cover means for the lens system or lens systems of a telescopic rifle sight, which means is extremely simple so that it does not require any modification of the existing form of the rifle sight and necessitates only a bare minimum of parts for installation, either as an attachment to an existing rifle sight or as a part of a rifle sight as manufactured. Because of the fact that very simple means are provided for mounting the transparent disc or lens member in place on the ends of the tube, it is obvious that no servicing of the parts will be required and that the expense of the protective cover assembly, as an attachment, will be extremely low and the overall cost of a telescopic rifle sight with the protective cover assembly will not be measurably increased.

The foregoing and ancillary objects are attained by this invention, the preferred embodiments of which are set forth in the following description and illustrated in the accompanying drawing, wherein:

FIGURE 1 is a perspective view of a telescopic rifle sight mounted in place, in a conventional manner, on a rifle and having the protective cover assembly of this invention provided on its ends;

FIGURE 2 is a longitudinal vertical sectional view of the telescopic rifle sight and is taken on line 2—2 of FIGURE 1;

FIGURE 3 is a side elevational view of one end of a telescopic rifle sight showing another means for attaching the protective cover assembly of this invention to the ends of the tube on the sight;

FIGURE 4 is a detailed longitudinal sectional view of one end of the tube of the telescopic sight showing another means for attaching the protective cover assembly of the present invention to the end of the tube; and FIGURE 5 is a longitudinal sectional view of one end of the tube of the telescopic sight showing a further means for attaching the protective cover assembly of the present invention to the end of the tube on the sight.

Referring now more particularly to the drawing, the protective cover assembly for the lens systems of a telescopic rifle sight is shown in attachment to the telescope 10 of FIGURE 1, which telescope is mounted in a conventional manner in place on a rifle 12. The telescope is of conventional construction and includes an elongated central portion 14 and enlarged tubular open end portions 16 and 18. An ocular lens system 20 is mounted in the end portion 18 while an objective lens system 22 is mounted in the tubular end portion 16. It is to be noted that, with respect to FIGURE 2, each lens system is mounted in a conventional manner so that it is disposed inwardly from the open ends 24 and 26 of the tube. With such conventional construction, it can be appreciated that the outer surfaces of the lens systems will become dirty with dust in dry weather or will become clogged with ice during snowy or rainy weather or become fogged during certain temperature changes. It can be seen that the only possible way to clean the surfaces is to insert a cloth into the open ends of the tube with the cloth wrapped around a finger or the like object and thus clean the surfaces. This is not too effective and is very impractical from the standpoint of readying the sight for instantaneous use.

To overcome this drawback, I propose to provide a protective cover assembly which is indicated by the reference numeral 28 in FIGURE 2. The protective cover assembly comprises a transparent disc or lens member 30 which may be formed from any suitable transparent material, such as plastic, glass or the like and which is of a diameter at least greater than the internal diameter of the open end portions of the tube.

As shown in FIGURE 2, the transparent disc 30 has a rear surface 32 which abuts the edge of the open ends of the tube. The disc is annular and, for convenience in mounting on the open ends of the tubes in a sealing manner so as to seal off the ends of the tube with the rear surfaces 32 of the disc sealingly engaging the end edges of the open ends of the tube, the outer portion of the peripheral surface of the disc is beveled, as at 34. A sleeve 36, which may be formed from plastic, metal or rubber, is received over the open ends of the tube and has an outer inturned flanged end 38 which fits on the beveled surface of the disc and which clamps the disc in place on the ends of the tube.

In this fashion, the protective discs are mounted on the opposing ends of the tube in a manner to protectively and sealingly overlie the lens systems of the telescopic sight.

It is to be particularly noted that the discs have outer flat surfaces 39 which are exposed and which lie beyond or are disposed beyond the ends of the tube and, because of the form of bezel mounting of the discs on the ends of the tube, the outer surfaces are free from any obstructions. Therefore, it can be appreciated that the outer surfaces, if they become fogged or dirty, can be easily wiped by passing them over the sleeve of a body portion of the hunter's garment or by quickly using a cloth to wipe the surfaces or even using the finger or palm of the hand.

Another form of means for attaching the transparent disc or lens member in place on the open ends of the tube is shown in FIGURE 3. In FIGURE 3, the disc member 30a is shaped and formed exactly like the disc member 30 of FIGURE 2 and thus has a beveled peripheral surface 34a which is engaged by the inturned flanged end 38a of a ring 36a. However, instead of being press fitted or frictionally fitted on the outer surface of the end portions of the tube, as is the case in the form of FIGURE 2, the ring 36a is internally threaded and is adapted to be threaded onto the exterior threads 40 formed on the outer surfaces of the end portions of the tube.

In FIGURE 4, another manner of mounting the protective cover assembly in place is shown wherein the disc member 30b is fitted in a channel portion 42 of a ring 44, the channel portion being provided on the outer end of the ring. The ring is exteriorly threaded and is threaded into the interiorly threaded end 46 of the end portion of the tube. The disc member has a beveled peripheral surface 47 which is engaged by the angular leg of the channel portion 42 with the leg portions of the channel clamping the disc in such fashion in place so that the outer surface of the disc is completely unobstructed and exposed.

In FIGURE 5, the disc member 30c is formed with an integral coaxially reduced inner end portion 48 which is provided with a circumferential annular groove 50. An O-ring 52 is seated in the groove, and holds the end portion 48 tightly pressed in the end of the tube. This form eliminates the retaining ring arrangement of the other forms. The disc with its integral coaxially reduced end portion can be machined or cast from suitable plastic or other material. The ring sealingly holds the end portion in place within the inner surface of the ring 54 that is provided to hold the lens system in place.

It is thus obvious that various means may be provided for attaching the protective cover assembly to the open ends of the tube of the telescopic sight, such means being of a nature that the protective cover assembly can be sold as an attachment for modifying existing telescopic sights or can be made as a part of the sight when it is being manufactured. Common to all of the means for mounting the transparent disc or lens member in place on the open ends of the tube are the features that the disc member is sealingly held on the ends of the tube to seal off and protectively overlie and close the associated lens system and that the outer surfaces of the disc or lens member is not obstructed and is exposed so that it may be easily wiped off and cleaned.

It is to be understood that the cover means or device may be used on any tubular lens system instrument whether of the telescopic sight or binocular type for the purpose of protectively enclosing the recessed lens systems in the tubular member of such optical system.

Thus while the preferred forms of this invention have been described and illustrated herein, various changes may be made and the forms may be used in different environments according to the spirit of the appended claims.

What is claimed is:

1. A protective cover assembly for use with a telescopic rifle sight including a tube having opposed open ends, each end having an outer diameter and an inner diameter, an objective lens system mounted in the tube adjacent one end and spaced inwardly therefrom, and an ocular lens system mounted in the tube adjacent the other end and spaced inwardly therefrom, the cover assembly comprising:

(a) a transparent disc disposed at each open end of the tube and having an outer surface;

(b) the discs being respectively substantially equal in diameter to said outer diameters of the tube and including a peripheral edge;

(c) the peripheral edge of each disc being beveled adjacent said outer surface so that the outer surfaces are respectively substantially equal in diameter said inner diameters of the tube; and (d) means for mounting the disc to the respective tube ends such that the outer surfaces thereof are exposed and lie beyond the respective ends and beyond said means.

2. A protective cover assembly as defined in claim 1 wherein the means mounting the discs to the tube ends comprise:

(a) a sleeve frictionally fitted on the end of the tube and having an inturned, flanged end fitting on the beveled edge of the disc and clamping same against the end of the tube.

3. A protective cover assembly as defined in claim 1 wherein the means mounting the discs to the tube ends comprise:

(a) exterior thread means on the tube ends; and
(b) internal thread means on the sleeves engaging the first named thread means.

4. A protective cover assembly as defined in claim 1 wherein the means mounting the discs to the tube ends comprise:

(a) a retaining ring;
(b) cooperative clamping means provided between the ring and the outer peripheral surface of the disc; and
(c) means securing the ring to the end of the tube.

5. A protective cover assembly as defined in claim 1 wherein the means mounting the discs to the tube ends comprise:

(a) an integral coaxially reduced portion on the disc; and
(b) means sealingly retaining said reduced portion in the end of the tube.

6. A protective cover assembly as defined in claim 1 wherein the means mounting the discs to the tube ends comprise:
  (a) a retaining ring fitted on the end of the tube and clampingly engaging the outer peripheral surface of the disc.

7. A protective cover assembly for use with a telescopic rifle sight or the like including a tube having opposed open ends, the cover assembly comprising:
  (a) a transparent disc disposed at each open end of the tube and having an outer surface; and
  (b) means for mounting the disc to the respective tube end such that the outer surfaces thereof are exposed and lie beyond the respective ends and beyond said means.

References Cited in the file of this patent

UNITED STATES PATENTS

| | | |
|---|---|---|
| 579,619 | Watkins | Mar. 30, 1897 |
| 2,085,277 | Smith | June 29, 1937 |
| 2,153,807 | Kleinert | Apr. 11, 1939 |
| 2,533,547 | Anderson | Dec. 12, 1950 |
| 2,607,120 | Williams | Aug. 19, 1952 |
| 2,849,795 | Vissing | Sept. 2, 1958 |
| 3,048,301 | Arpin | Aug. 7, 1962 |

FOREIGN PATENTS

| | | |
|---|---|---|
| 21,443 | Great Britain | Nov. 12, 1895 |